(12) United States Patent
Eull

(10) Patent No.: US 6,938,716 B1
(45) Date of Patent: Sep. 6, 2005

(54) CONCRETE MIXING TRUCK ANTI-ROLLOVER SYSTEM

(75) Inventor: Thomas E. Eull, Blaine, MN (US)

(73) Assignee: Schwing America, Inc., White Bear Lake, MN (US)

( * ) Notice: Subject to any disclaimer, the term of this patent is extended or adjusted under 35 U.S.C. 154(b) by 171 days.

(21) Appl. No.: 10/391,147

(22) Filed: Mar. 18, 2003

Related U.S. Application Data

(60) Provisional application No. 60/365,231, filed on Mar. 18, 2002.

(51) Int. Cl.[7] .................. B60K 28/08; B60K 28/14; B62D 53/06
(52) U.S. Cl. .................. 180/282; 180/290; 280/432
(58) Field of Search .................. 280/86.5, 432, 280/767; 180/282, 290; 340/440, 441; 701/50, 701/124

(56) References Cited

U.S. PATENT DOCUMENTS

| | | | |
|---|---|---|---|
| 3,161,418 A | * | 12/1964 | Brennan et al. ........... 280/81.1 |
| 3,773,304 A | * | 11/1973 | Hodgson ..................... 366/61 |
| 4,206,829 A | * | 6/1980 | Melocik ..................... 180/290 |
| 4,261,616 A | * | 4/1981 | Beegle ..................... 298/17 S |
| 4,585,356 A | * | 4/1986 | Hudelmaier ................ 366/60 |
| 4,712,807 A | | 12/1987 | Kurosawa |
| 5,032,821 A | | 7/1991 | Domanico et al. |
| 5,149,126 A | * | 9/1992 | Brennan ..................... 280/86.5 |
| 5,383,680 A | * | 1/1995 | Bock et al. .............. 280/5.503 |
| 5,825,284 A | | 10/1998 | Dunwoody et al. |
| 5,897,123 A | * | 4/1999 | Cherney et al. ........... 280/86.5 |
| 6,209,887 B1 | | 4/2001 | Kyrtsos |
| 6,225,894 B1 | | 5/2001 | Kyrtsos |
| 6,363,331 B1 | | 3/2002 | Kyrtsos |
| 6,452,487 B1 | * | 9/2002 | Krupinski ................... 340/440 |

FOREIGN PATENT DOCUMENTS

| | | | | |
|---|---|---|---|---|
| JP | 59092273 A | * | 5/1984 | ......... B62D 49/08 |
| JP | 04191179 A | * | 7/1992 | ......... B62D 49/08 |

OTHER PUBLICATIONS

Arvin Meritor article from www.arvinmeritor.com, published prior to Mar. 18, 2003.

* cited by examiner

Primary Examiner—Paul N. Dickson
Assistant Examiner—Laura B Rosenberg
(74) Attorney, Agent, or Firm—Kinney & Lange P.A.

(57) ABSTRACT

An anti-rollover system is used with a concrete mixing truck with a mixing drum, in particular during turning maneuvers, for preventing rollovers by the truck. The anti-rollover system is comprised of one or more sensors on the truck which generate an input signal representative of the truck's operating conditions indicative of a rollover condition. The system compares the sensor signal against stored data indicative of rollover conditions and if necessary initiates corrective action to prevent the truck from rolling over. Corrective action includes stopping, or in some circumstances slowing, rotation of the drum carrying a concrete load. With mixing trucks including a booster axle system, corrective action may additionally or separately include unloading the booster axle.

21 Claims, 7 Drawing Sheets

CONCRETE MIXING TRUCK ANTI-ROLLOVER SYSTEM

CROSS-REFERENCE TO RELATED APPLICATION

This application claims priority from provisional application No. 60/365,231 filed Mar. 18, 2002, for "Cement Mixing Truck Anti-Rollover System" by Thomas E. Eull.

BACKGROUND OF THE INVENTION

The present invention is an anti-rollover system to prevent rollovers of a concrete mixing truck. In particular, the anti-rollover system provides input data representative of operating conditions of the mixing truck and based upon the input data initiates corrective action to prevent the mixing truck from rolling over during turning maneuvers.

Concrete mixing trucks are used to transport concrete to a work site while mixing the cement and aggregate payload. A chute attached below a discharge opening of the drum delivers concrete from the drum to the work site.

Some concrete mixing trucks include a booster axle system attached to the rear of the truck, which distributes the gross vehicle weight of the truck over a longer wheelbase. The booster axle system is an optional feature which is not included on all concrete mixing trucks. The booster axle is comprised of a pair of substantially parallel arms pivotally attached to the frame rails at the rear of the truck. A set of wheels are attached to the extreme end of the arms. A booster axle cylinder is attached between the truck frame and the arms to raise and lower the booster axle by hydraulic pressure. The booster axle is movable between a load position, an unload position and a raised position. In the load position, hydraulic pressure pushes the booster axle downward towards the ground and the booster axle carries a portion of the gross vehicle weight load. In the unload, deactivated position, pressure is reversed within the booster axle cylinder. Although, the axle still rests on the ground, the booster axle neither receives down pressure from the cylinder nor carries a portion of the load. In the raised position, the booster axle is raised off the ground and rests against the drum roller support pedestal, or rear pedestal.

An operating concern with concrete mixing trucks is roll moments that can exist while the truck is turning, which can cause the truck to roll over. As the truck turns, centrifugal force acts on the truck in a direction opposite the direction of the turn. For turns to the right, the risk exists of the centrifugal force causing the truck to tip over to the left. For example, the potential for roll-over conditions exists when the speed of the truck is too high during a right turn, such as may occur when the truck is traveling on a cloverleaf exit ramp to the right. Additional conditions that may contribute to a roll-over condition include the clockwise rotation of the drum (as viewed from the rear of the truck), which causes the concrete load to laterally shift to the left side thereby resulting in a shifting of the truck's center of gravity. This rotation occurs when the truck is at a standstill and when the truck is being driven. While the drum is rotating, the concrete load in the drum shifts upward along the left side of the drum (as viewed from the rear of the truck). Increasing drum rotation speed laterally shifts the load even further along the left side of the drum and shifts the center of gravity to the left of center.

Also, the truck chassis suspension, due to the lateral load shift, will become more heavily laden on the left side of the vehicle, effectively causing the truck chassis to list to the heavy side. When this event occurs, the listing of the vehicle can be magnified by the downward force applied by the hydraulic cylinder to the booster axle system. This downward force can have a levering effect which may further contribute to a rollover of the truck.

Excessive lateral load shifting, as a result of drum rotation, vehicle speed during turning maneuvers, and the high center of gravity inherent in concrete mixing trucks contribute to a roll moment which can cause truck rollovers to the left during a right turn. An anti-rollover system is needed for concrete mixing trucks that detects a potential roll moment and initiates corrective action to prevent the truck from rolling over during a turn.

BRIEF SUMMARY OF THE INVENTION

The present invention relates to an anti-rollover system for a concrete mixing truck, in particular for use during turning maneuvers. The anti-rollover system is comprised of one or more sensors which sense input data representative of the truck's operating conditions, including potential rollover conditions. Based on a comparison of the input data to stored data representative of a rollover condition, the system initiates corrective action in an effort to prevent the truck from rolling over. Corrective action includes stopping, or in some circumstances slowing, rotation of the drum carrying a concrete load. With mixing trucks including a hydraulicly actuated booster axle system, an additional or alternative corrective action may include unloading hydraulic pressure on the hydraulic cylinder actuating the booster axle. The system includes a computer for receiving the input signals and generating an output signal to initiate corrective action.

DETAILED DESCRIPTION

The present invention is an anti-rollover system for a concrete mixing truck that detects potential rollover conditions and initiates corrective action in an effort to prevent a rollover of the truck during turning maneuvers. The anti-rollover system is comprised of a plurality of sensors and a computer. The anti-rollover system detects conditions which could lead to a rollover when the concrete mixing truck makes a turn and the system initiates corrective action to prevent a rollover. The sensors of the anti-rollover system measure input data representative of the truck's operating conditions, including those conditions which can lead to a potential rollover. The data is transmitted as input signals to the computer. The input signals are compared against stored sample data obtained during empirical studies of rollovers. Based on this comparison, the system determines whether the input signals indicate that operating conditions are approaching a threshold indicative of a rollover, and if so, the system initiates corrective action to prevent the truck from rolling over. Corrective action includes stopping rotation of the drum, or in some cases slowing rotation. With mixing trucks including a booster axle system, further corrective action includes releasing pressure from the booster axle to unload the booster axle.

Figure 1:
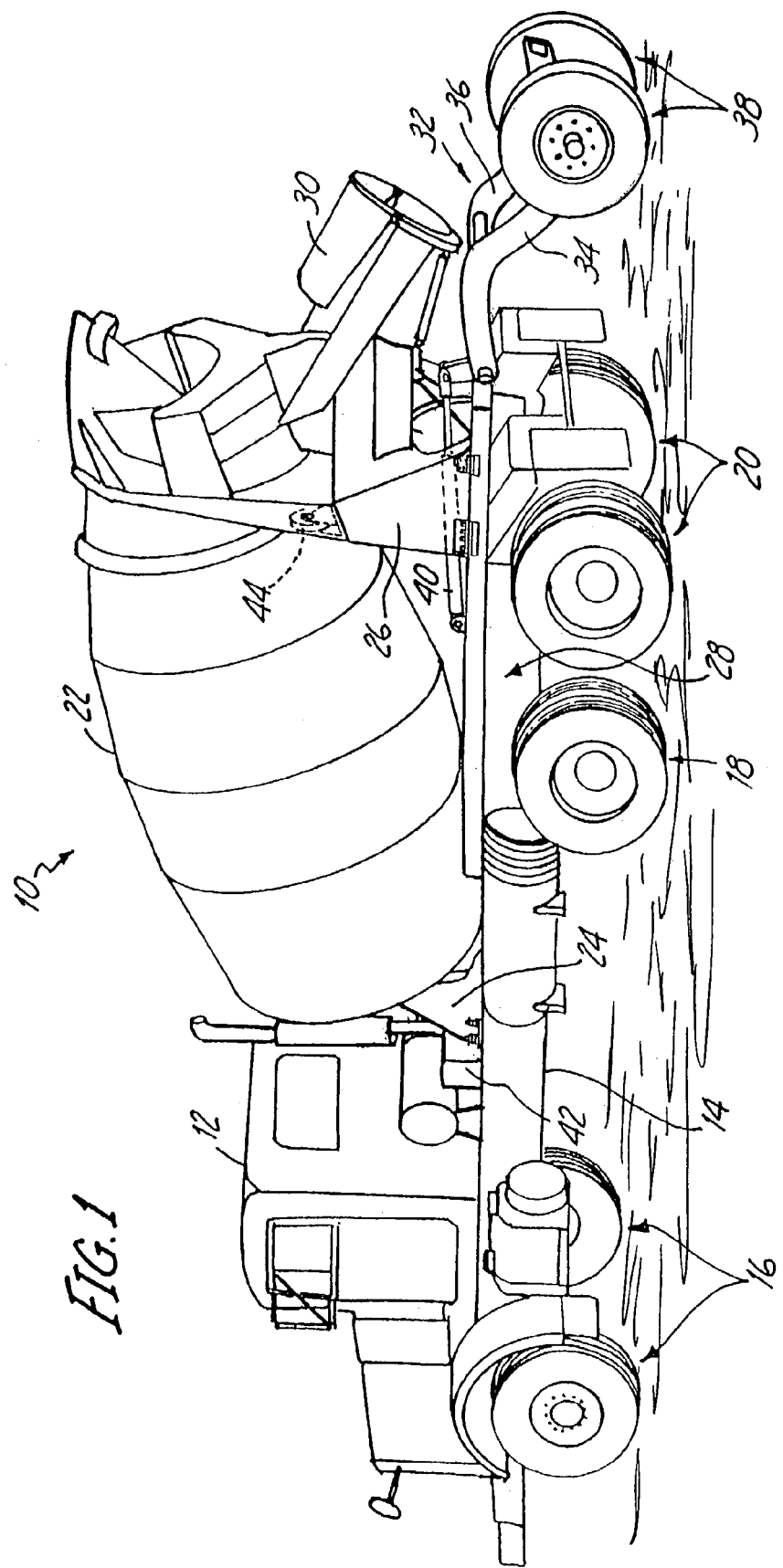
FIG. 1 is a side perspective view of a concrete mixing truck, including a booster axle system.

FIG. 1 is a side perspective view of a concrete mixing truck 10 with which the present invention is concerned. The mixing truck 10 has a cab 12 and a chassis 14. The truck 10 typically has three sets of wheels, one set 16 at the cab 12 and a tandem set on the chassis 14, a front truck set 18 and a rear truck set 20. A drum 22 for holding and mixing concrete is supported by the chassis and attached between a front pedestal 24 and a rear pedestal 26. The front and rear pedestals 24, 26 are connected to a frame 28 of the chassis 14. Rear pedestal 26 has a greater height than front pedestal 24 to elevate the rear of the drum 22. A drum motor (shown in FIG. 3) controls rotation of the drum 22 to mix the concrete. A chute 30 is attached to a discharge opening at the rear of the drum 22, such that the concrete is delivered by the chute 30 from the drum 22 to a work site.

Some concrete mixing trucks include an optional booster axle system 32 which is attached to a rear of the chassis 14. In use, the booster axle system 32 helps to distribute and balance the load from the chassis 14, in particular the drum 22, by carrying a portion of the load. The booster axle 32 distributes the gross vehicle weight of the truck over a longer wheelbase. The booster axle 32 is comprised of a pair of substantially parallel arms 34, 36 pivotally attached to frame rails at the rear of the truck 10. A set of wheels 38 are attached to the rear end of the arms 34,36. A booster axle hydraulic cylinder 40 is attached between the frame 28 and the arms 34, 36 to raise and lower the booster axle 32 by hydraulic pressure.

The booster axle 32 is movable between a load position, an unload position, and a raised position. Movement of the booster axle 32 between these three positions is controlled by hydraulic relief valves (shown in FIG. 3) and hydraulic cylinder 40. In the load position, hydraulic cylinder 40 exerts a force on the booster axle 32, pressing the booster axle downward onto the ground. In the load position, the booster axle carries part of the vehicle weight and thereby reduces the load on the rear axles of the truck. In the unload or deactivated position, hydraulic pressure on cylinder 40 is relieved such that wheels 38 of booster axle 32 remain on the ground, however, the booster axle 32 does not carry any load. In the raised position, the booster axle 32 is raised above the ground and rests against the rear pedestal 26.

A hydraulic reservoir (shown in FIG. 3) and a hydraulic block 42 are located near the front of the chassis 14 between the drum 22 and the cab 12. The hydraulic block 42 houses a plurality of relief valves which regulate the hydraulic pressure needed to operate equipment on the truck 10, including a drum motor (shown in FIG. 3) and the booster axle cylinder 40.

A pair of drum rollers 44 and 46 (shown in FIG. 4) are attached to the rear pedestal 26 and engage a rear portion of the drum 22. The rollers 44, 46 support drum 22 on the rear pedestal 26 and allow rotation of the drum 22 in the clockwise direction (as viewed from the rear of the truck). In a first embodiment of the anti-rollover system of present invention, a pair of sensors (shown in FIG. 4) are associated with rollers 44, 46 (discussed below). In alternate embodiments of the anti-rollover system, sensors may be located at the rear pedestal 26, the front pedestal 24, or at either set of rear wheels of the truck.

Figure 2:
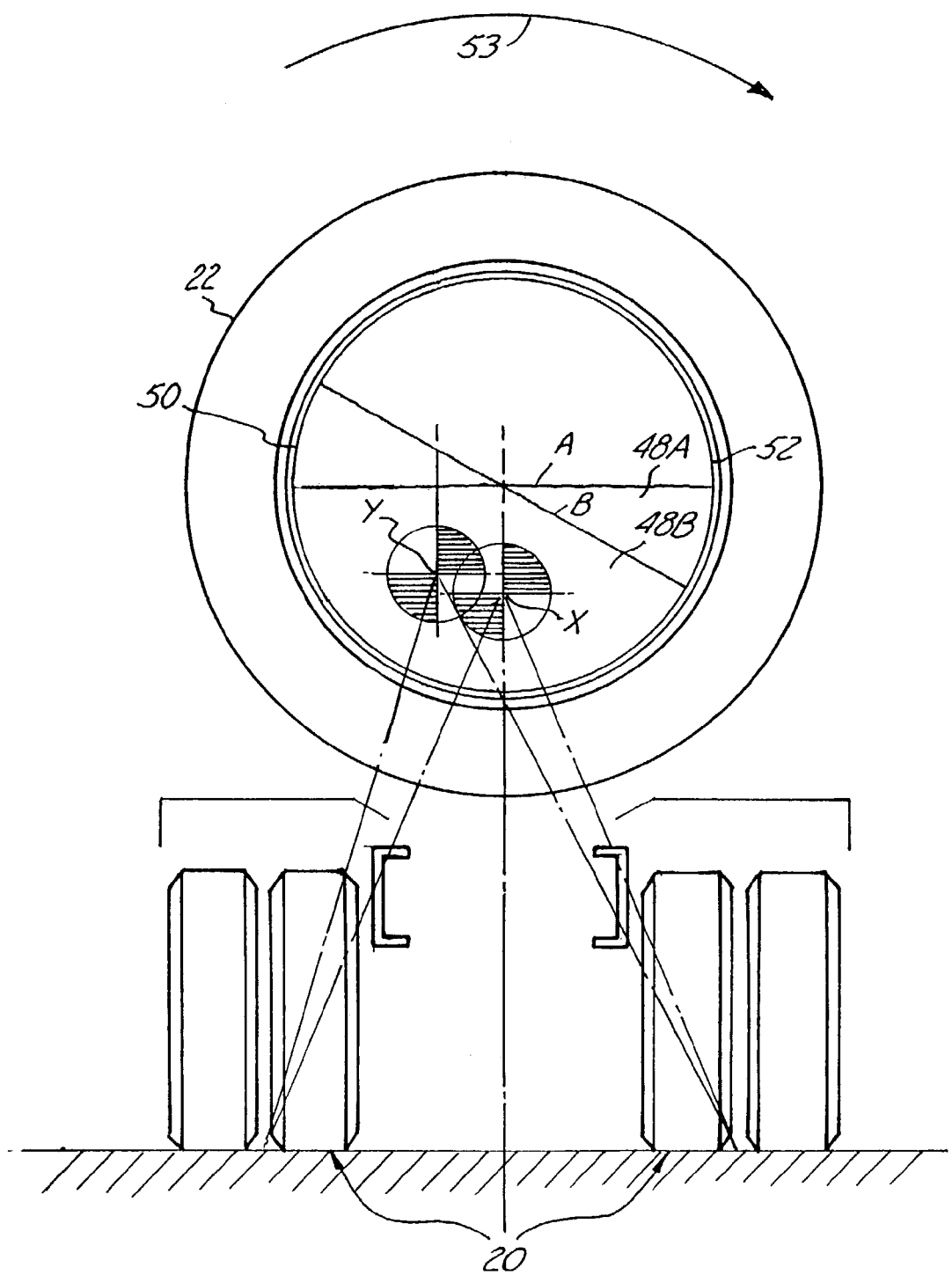
FIG. 2 is a schematic of a rear view of a concrete mixing truck, including concrete load shift during rotation of the drum.

FIG. 2 is a schematic view of the rear of the concrete mixing truck 10 showing a concrete load 48A when drum 22 is not rotating, and load 48B when drum 22 is rotating. When the drum 22 is at rest and not rotating, the concrete load 48A is at a dead load position shown by line A. In the dead load position, the concrete load 48A is equally dispersed along the bottom of the drum between a left side 50 and a right side 52 of the drum 22. The center of gravity for the concrete load in the dead load position is at point X. The center of gravity is centered between the rear truck set of tires 20.

To mix the cement and aggregate within the drum 22, the drum 22 is rotated in the clockwise direction shown by arrow 53 (as seen from the rear of the truck). As the drum 22 rotates, the concrete load 48B moves to a live load position, shown by line B. In the live load position, the concrete load 48B rises, or laterally shifts, up along the left side 50 of the drum. The center of gravity when the concrete load is in the live load position is generally at point Y. During drum rotation, the concrete load 48B is not equally dispersed between the left and right sides 50, 52 of the drum. The center of gravity rises higher in the drum 22 and shifts to the left of the rear truck set of wheels 20.

In some concrete mixing trucks, the speed of drum rotation is based upon the drive transmission speed. As the transmission of truck 10 is shifted into higher gears and the engine speed is increased, drum rotation speed increases. The rise of the concrete load on the left side of drum 22 is a function of the rotation speed of drum 22, with a greater rise occurring at higher drum rotation speed. Thus, the live load position center of gravity Y moves further away from the lower, centered dead load position center of gravity X. Rollover conditions are especially possible when the concrete mixing truck 10 makes a right turn, because centrifugal force in the opposite direction further increases the concrete load shift up along the left side of the drum. Drum rotation and the high, off-centered center of gravity, combined with increased load shifting caused by a right turn, contribute to a potential roll moment which may lead to a rollover.

For example, a concrete mixing truck 10 beginning a right turn from a substantially stationary position can reach a speed of about 12 miles per hour by the end of the turn. At the beginning of the turn, the drum is rotating and the concrete load is in the live load position with the center of gravity shifted to the left side of the drum. When the driver shifts the transmission of truck 10 into a higher gear, the drum rotation speed increases, which further shifts the concrete load to the left side 50 of the drum 22. The increased lateral load shift caused by the combination of increased drum rotation, the right turn, and the high center of gravity inherent to concrete mixing trucks, contributes to a potential roll moment that can cause the truck 10 to rollover. The same problem can arise when the truck 10 makes a turn at high speeds, such as while navigating a cloverleaf exit ramp or a sharp turn in a roadway.

During a turn, the load carried by the booster axle 32 may be partially decreased. To compensate, the hydraulic pressure delivered to hydraulic cylinder 40 is automatically adjusted to increase the downward force on the booster axle 32 and maintain the desired load on the booster axle 32. The increase of hydraulic pressure to hydraulic cylinder 40 during a vehicle turn may further contribute to a potential truck rollover.

Figure 3:
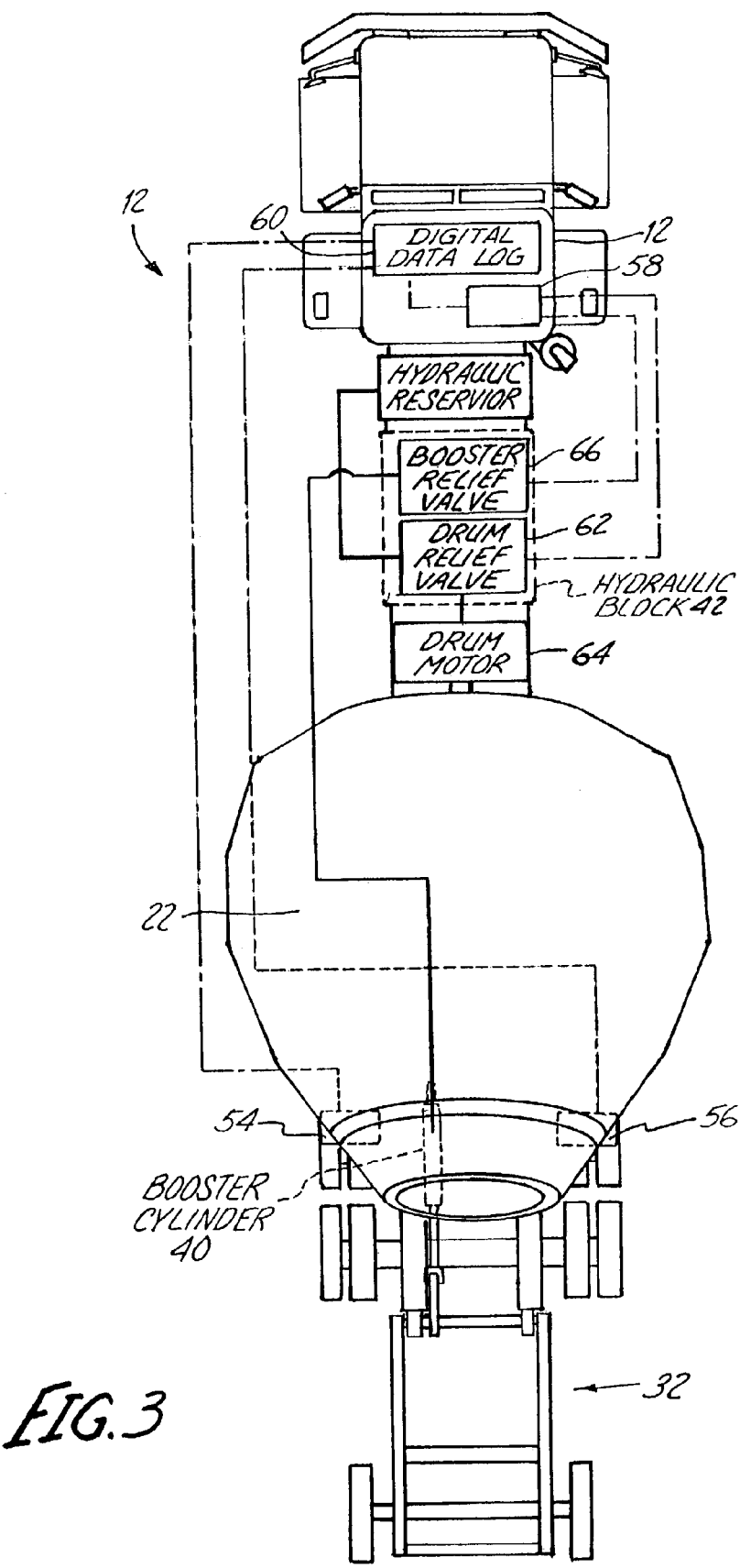
FIG. 3 is a schematic diagram of a first embodiment of anti-rollover system.

FIG. 3 is a schematic drawing showing the electrical and hydraulic connections for components of the anti-rollover system of the present invention. The electrical connections are represented by a dash-dot-dash line and the hydraulic connections are represented by a solid line. A first sensor 54 and a second sensor 56 are located on the truck 10 to measure data representative of the truck's operating conditions. The sensors 54, 56 sense input data representative of parameters relevant to the operation and load of the truck 10. A wide variety of different sensors measuring different parameters may be used. For example, the type of sensors used may include load cells, accelerometers, hydraulic pressure sensors, or torque sensors. The location of the first and second sensors 54, 56 shown in FIG. 3 does not restrict where the sensors are located in other embodiments of the anti-rollover system. Some embodiments may include a single sensor, and some embodiments may include more than two sensors.

The sensors 54, 56 measure data representative of current operating conditions of the mixing truck 10. The data is transmitted as an input signal to a computer 58 preferably located in the cab 12 of the truck 10. Each sensor is individually, electrically connected to the computer, such as a central processing unit (CPU) or a programable logic controller (PLC). As seen in FIG. 3, the sensors 54, 56 may optionally be connected to a digital data log 60 which displays the data gathered by the sensors. The digital data log 60 then transmits the input signals to the computer 58. An example of a digital data log for displaying data from load cells is included with the ACCUWEIGH9700 System by Precision Loads of Seattle, Wash.

Sample data indicative of operating conditions which result in a rollover are stored by the computer 58. The input signals received by the computer 58 are analyzed and compared with the sample data to determine whether or not the measured operating conditions are likely to exceed a predetermined threshold indicative of a rollover. If the measured operating conditions indicate the potential for exceeding the predetermined threshold, the computer 58 initiates corrective action to prevent a rollover.

In one embodiment, corrective action to prevent a rollover involves stopping rotation of the drum 22. The computer 58 sends a signal to open a drum relief valve 62 (or directional valve), which controls a drum motor 64. In the open position, the drum relief valve 62 dumps hydraulic pressure to drum motor 64 which instantaneously stops rotation of the drum 22 and stops flow of a pump at the drum motor. Under certain conditions, drum rotation is slowed by the anti-rollover system. To slow rotation of the drum 22, the drum relief valve 62 partially opens to decrease hydraulic pressure to drum motor 64 and slow flow through the pump.

In an alternative embodiment, besides altering drum rotation, corrective action to prevent a rollover involves unloading the booster axle 32. During a turn, the load carried by the booster axle 32 is partially decreased. To compensate, hydraulic pressure to the cylinder 40 is automatically increased to maintain the desired load on the booster axle 32. The increased hydraulic pressure delivered to the booster axle cylinder causes an increased downward force of the booster axle against the ground, which can have a levering effect that may further contribute to a potential rollover by the truck 10. If the data from the sensors 54, 56 indicates that a predetermined threshold indicative of a rollover exists, the computer 58 sends a signal to the booster relief valve 66 to unload the booster axle 32. The booster relief valve 66 opens to instantaneously release pressure in the booster axle cylinder 40. Pressure in the cylinder 40 is released, thereby putting the booster axle 32 in the unload position and reducing a potential catapult effect by the booster axle 32. The relief valves 62, 66 are located on the hydraulic block 42.

In further embodiments of the anti-rollover system, additional features are included. For example, a manual switch is included to override the anti-rollover system. A reset feature is included to reset the relief valves in the anti-rollover system, thus, allowing the drum relief valve and the booster relief valve to be re-pressurized such that the drum motor begins rotation and the booster axle moves back to the load position. The reset feature is preferably a manual reset switch. Also, a visual or auditory alarm is included to notify the driver that rollover conditions exist and corrective actions are being initiated.

Figure 4:
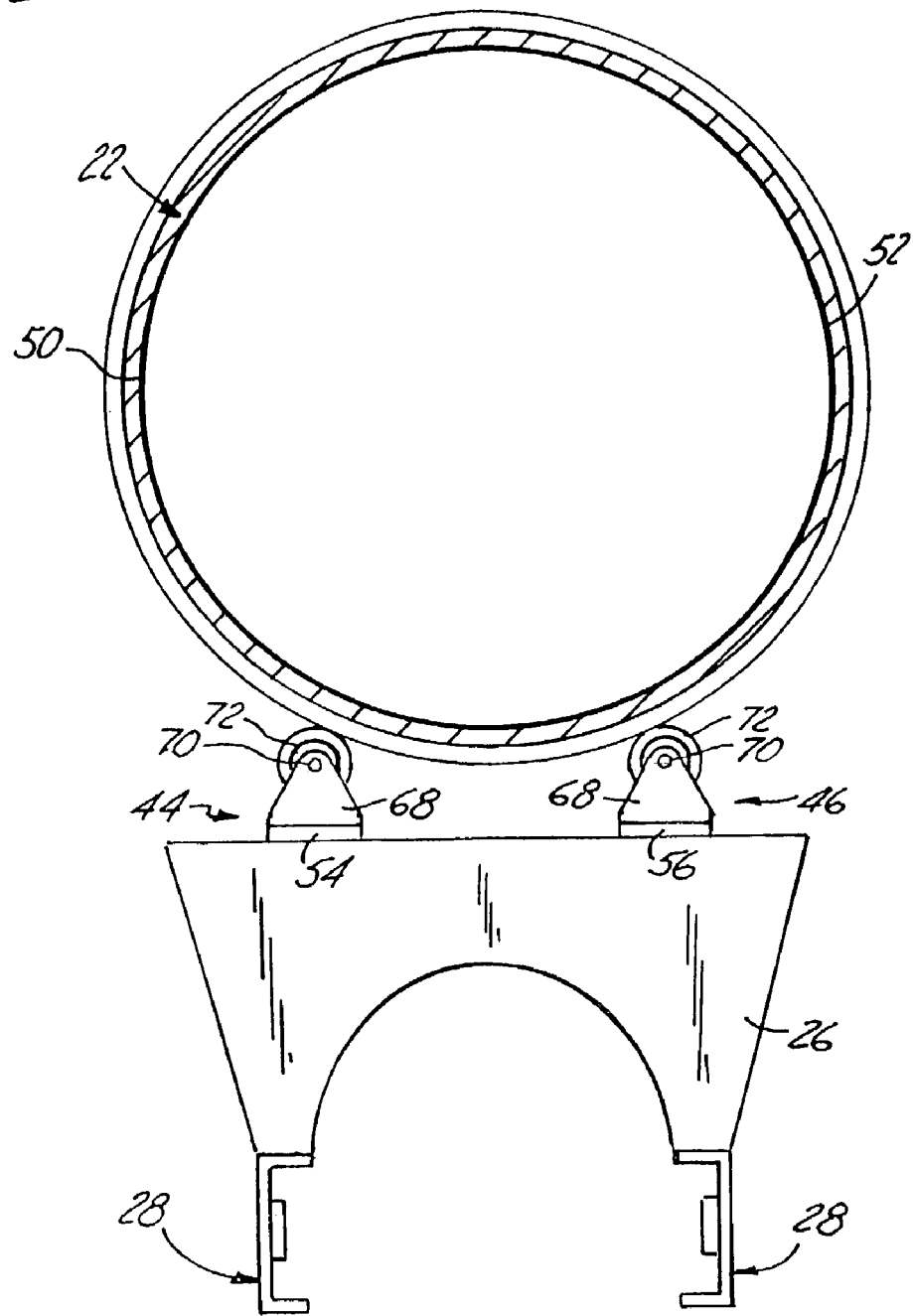
FIG. 4 is a rear sectional view of a first embodiment of the anti-rollover system.

FIG. 4 is a rear sectional view of the concrete mixing truck 10 demonstrating the first embodiment of the anti-rollover system of the present invention. In this embodiment, the first and second sensors 54, 56 are load cell sensors which measure the load of the drum 22. First and second drum rollers 44, 46 are attached to the rear pedestal 26 and engage a rear portion of the drum 22 to allow rotation of the drum 22 in the clockwise direction. As viewed from the rear, the first drum roller 44 is located on the left side of the drum 22 and the second drum roller 46 is located on the right side of the drum 22. The drum rollers 44, 46 are comprised of a base 68, a pin 70 and a roller 72. The base 68 of the drum roller 44, 46 is connected to the rear pedestal 26. The load cells 54, 56 are placed between the base 68 and the rear pedestal 26. The first load cell 54 measures the load on the left side of the drum 22 and the second load cell 56 measures the load on the right side of the drum 22. In an alternate embodiment of the anti-rollover system, the load cell is a load pin which replaces the pin 70 connecting the base 68 to the concrete roller 72. The load pin performs the same function for measuring the concrete load.

To gauge the operating conditions which indicate a potential rollover condition, the load distribution across the drum rollers 44, 46 is monitored for conditions of excessive lateral load shifting to one side of the drum 22 as compared with the other side of the drum 22. When the concrete load is at the dead load position, the load measured by each load cell is approximately equal. As the drum 22 rotates and the concrete load shifts up along the left side 50 of the drum, the load measured by the left load cell 54 increases relative to that measured by the right load cell 56, i.e. the load measured on the left side 50 of the drum 22 is greater than that measured on the right side 52 of the drum 22.

The load cells 54, 56 measure the load carried by each drum roller 44, 46 and the load data is transmitted to the computer 58. The computer 58 determines whether the load data represents operating conditions indicative of a rollover. If the load data indicates rollover conditions, the computer 58 initiates the corrective actions discussed above to prevent a rollover.

Figure 5:
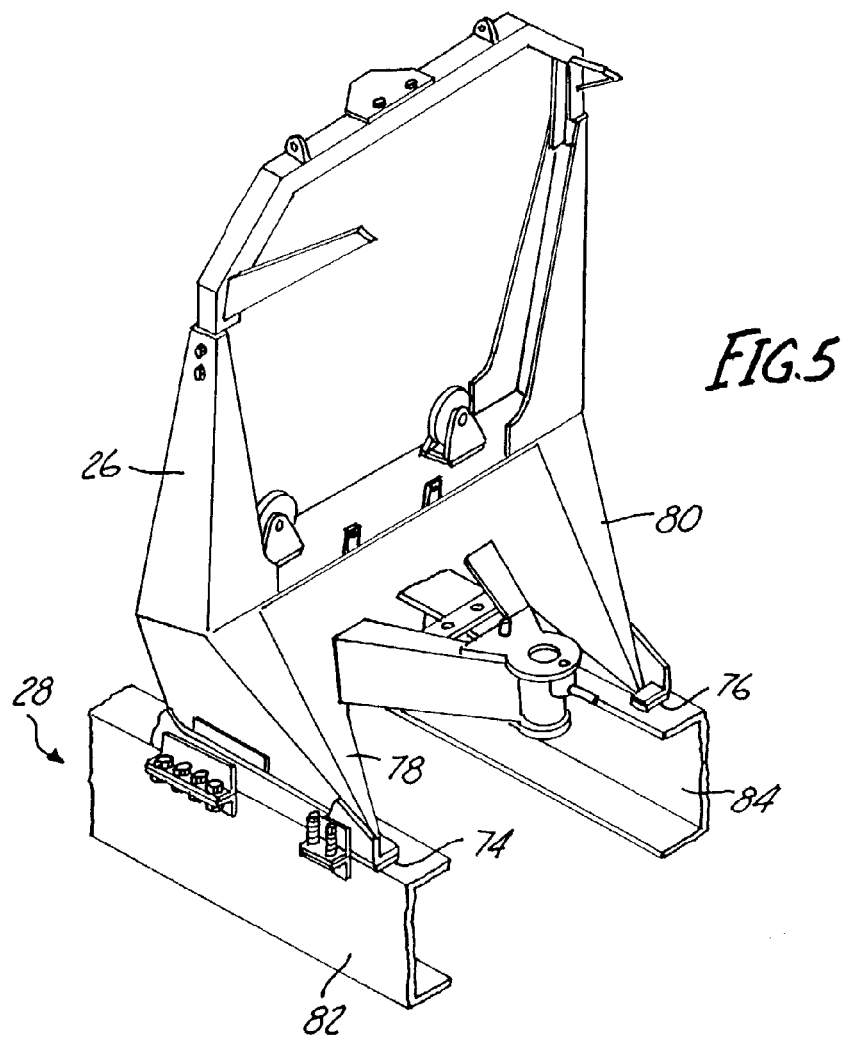
FIG. 5 is a side perspective view of a second embodiment of the anti-rollover system.

FIG. 5 is a side perspective view of a second embodiment of the anti-rollover system of the present invention utilizing load cells. In the second embodiment, first and second load cells 74, 76 are located between the rear pedestal 26 and the frame 28 of the chassis 14. The rear pedestal 26 includes a left leg 78 and a right leg 80. The frame 28 includes a left outer rail 82 and a right outer rail 84. The left leg 78 is attached to the left outer rail 82 and the right leg 80 is attached to the right outer rail 84. In the second embodiment of the present invention, the first load cell 74 is placed between the left leg 78 and the left outer rail 82 and the second load cell 76 is placed between the right leg 80 and the right outer rail 84. The first and second load cells 74, 76 measure the load of the drum 22 on the left and right sides and transmits the data to the computer 58 to determine whether rollover conditions exist as discussed above.

Figure 6:
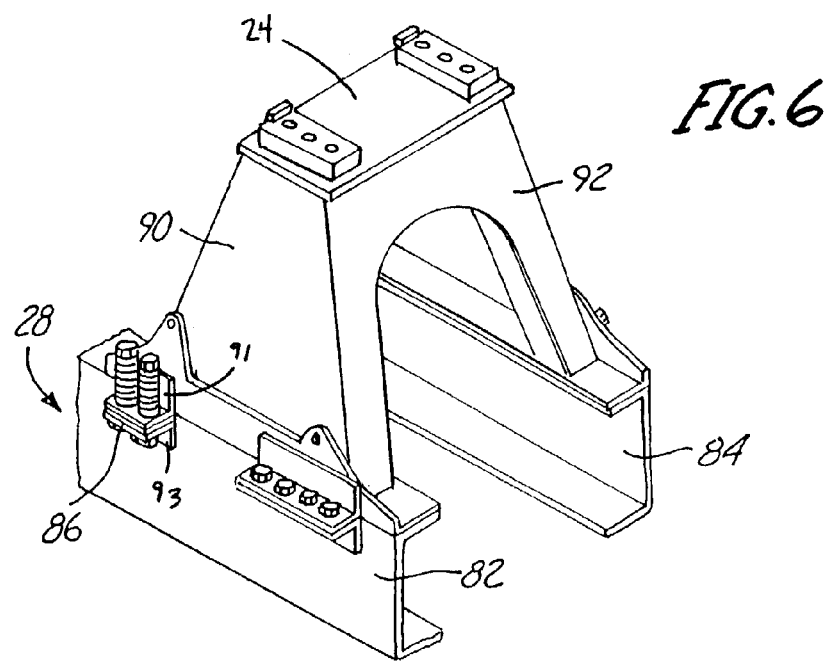
FIG. 6 is a side perspective view of a third embodiment of the anti-rollover system.

FIG. 6 is a side perspective view of a third embodiment of the present invention anti-rollover system utilizing load cells. In the third embodiment, a first load cell 86 and a second load cell are located at the front pedestal 24 (only the first load cell is shown in FIG. 6). The front pedestal 24 includes a left leg 90 and a right leg 92. The left leg 90 extends downward and is attached to the left outer rail 82 of the frame 28 and the right leg 92 extends downward and is attached to the right outer rail 84 of the frame 28. The first load cell 86 is placed between a bracket 91 of the left leg 90 and a bracket 93 of the left outer rail 82 and the second load cell (not shown) is placed between a bracket 91 of the right leg 92 and a bracket 93 of the right outer rail 84. Alternatively, both the load cells may be placed between the legs 90, 92 and 82, 84 outer rails of the frame 28 or only one of the load cells may be placed between brackets connecting the front pedestal 24 to the frame 28 of the truck while the other is placed between the leg and outer rail of the frame. The first load cell 86 and the second load cell 88 measure the load of the drum 22 on the left and right sides and transmit the data to the computer 58 to determine whether rollover conditions exist as discussed above.

Figure 7:
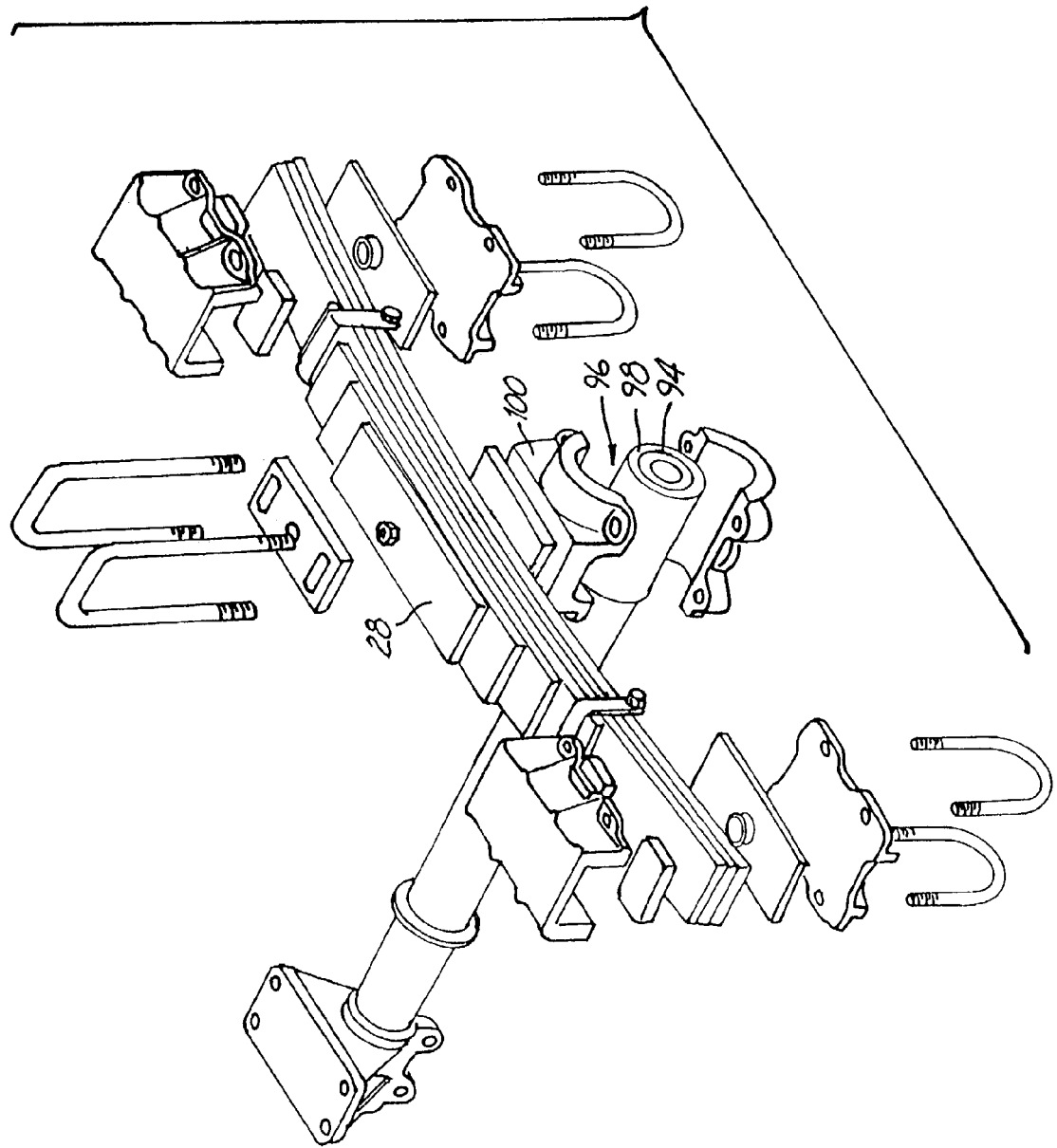
FIG. 7 is an exploded perspective view of a fourth embodiment of the anti-rollover system.

FIG. 7 is a side perspective view of a fourth embodiment of the anti-rollover system of the present invention utilizing load cells. In the fourth embodiment, first and second load cells are attached to an axle for the sets of truck tires, preferably the rear chassis set 20. First load cell 94 is connected to a left end 96 of the axle and the second load cell is connected to a right end of the axle (only the first load cell is shown in FIG. 7). Each load cell wraps around the end of the axle. The load cell is enclosed in a bushing 98 and the bushing further enclosed in a trunnion stand 100 which is attached to leaf spring 28 that is connected to the frame of the chassis. The first and second load cells measure the load of the truck 10 on the right and left sides and transmits the data to the computer 58 to determine whether rollover conditions exist as discussed above.

Figure 8:
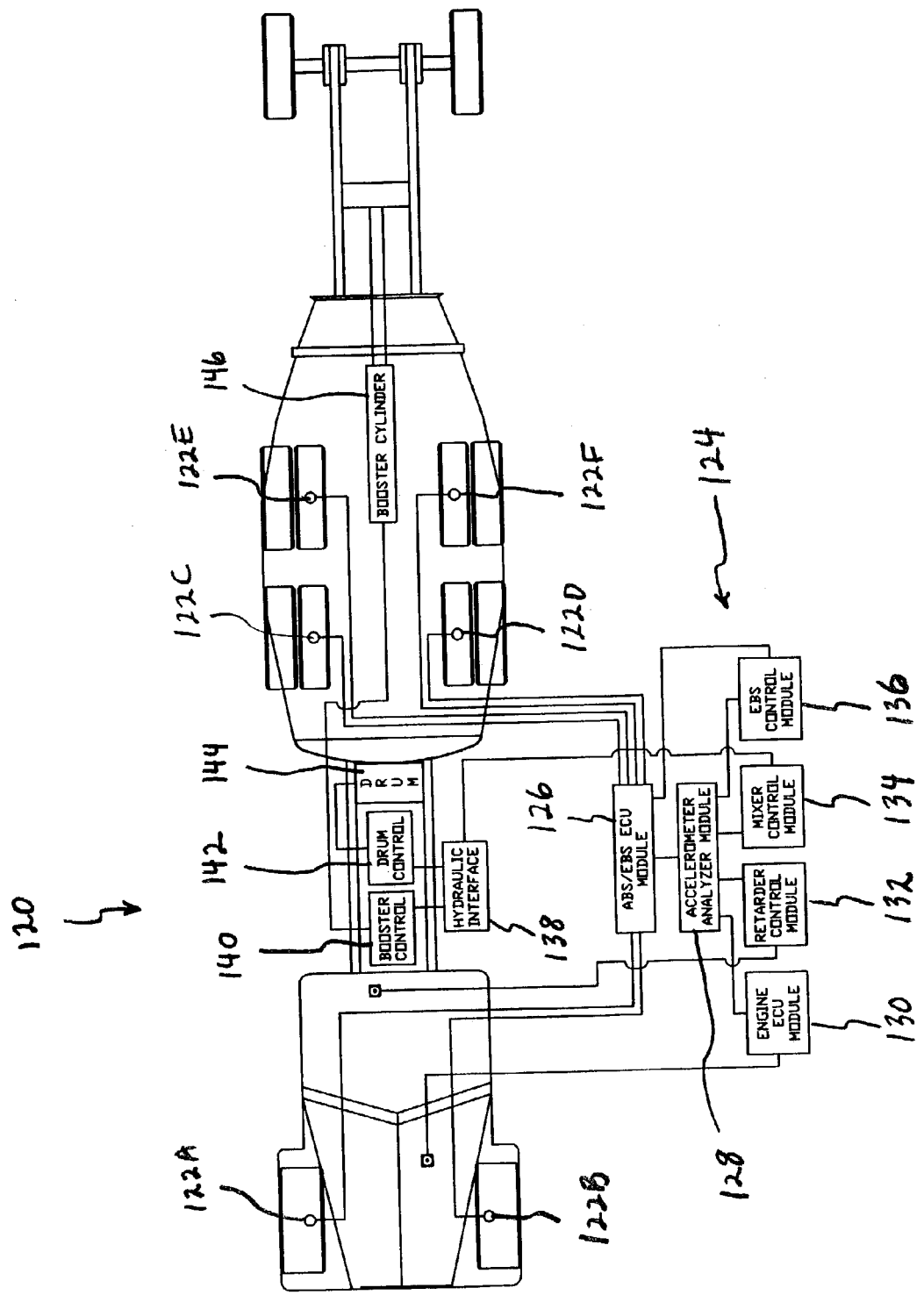
FIG. 8 is a schematic diagram of a fifth embodiment of anti-rollover system.

FIG. 8 is a schematic view of a fifth embodiment of the present invention. As shown in FIG. 8, anti-rollover system 120 alternatively comprises one or more sensors 122A–122F associated with the anti-lock and/or electronic brake system electronic control unit (ABS/EBS ECU). In one preferred embodiment, each of sensors 122A–122F is an accelerometer, which is capable of monitoring the truck's lateral acceleration. Sensors 122A–122F provide a signal indicative of the lateral acceleration of the truck to a control system 124 of the truck. Control system 124 includes an ABS/EBS ECU module 126 that receives the signals from one or more of sensors 122A–122F. The signals are then communicated to and analyzed by an accelerometer analyzer module 128, which stores data indicative of a lateral acceleration threshold for a rollover condition. A known control system for sensing and processing lateral acceleration signals is the RSC control system by Meritor WABCO Vehicle Control Systems of Troy, Mich.

If the signals generated by sensors 122A–122F exceed the lateral acceleration threshold, the accelerometer analyzer module 128 communicates with one or more modules, such as engine ECU module 130, retarder control module 132, mixer control module 134, or EBS control module 136, to initiate a corrective action to prevent a rollover. Engine ECU module 130 communicates with the truck engine to reduce engine speed. In one embodiment, the retarder control module 132 communicates with a drive line retarder associated with the propeller shaft of the truck. Alternatively, for vehicles equipped with automatic transmission, retarder control module 132 communicates with a retarder in the transmission of the truck to retard torque.

The mixer control module 134 communicates with a hydraulic interface 138 that signals one or both of the booster control 140 and/or the drum control 142 to actuate hydraulic relief valves for the drum motor 144 and/or the booster cylinder 146 in the manner previously described. Finally, the EBS control module 136 communicates with the ABS/EBS ECU module 126, which activates the truck's brakes to slow the truck and thereby prevent the truck from exceeding a critical lateral acceleration threshold.

The corrective actions initiated by each of the control modules 130–136 may be performed simultaneously, or sequentially in a predetermined order. If corrective actions are initiated sequentially, a first module signal selected by the control system is communicated to the respective truck component, and signals from the accelerometer are analyzed to determine if further corrective action is required. To the extent the initial corrective action does not result in bringing the lateral acceleration of the truck below the predetermined threshold, subsequent module signals are sequentially selected by the control system and communicated to the respective truck components until the lateral acceleration of the truck is below the predetermined threshold. In a preferred embodiment, the control system initiates corrective action first with the mixer control module 134.

In summary, the present invention is a method and apparatus for detecting and preventing a rollover by a concrete mixing truck carrying a concrete load in a drum. The apparatus is an anti-rollover system. The anti-rollover system stores data indicative of a rollover condition in a memory device, senses input data representative of operating conditions of the concrete mixing truck, compares the input data and sample data, and initiates corrective action if the input data is indicative of a rollover condition. The corrective action taken by the anti-rollover system includes any combination of the following: stopping rotation of the drum mixing concrete, slowing rotation of the drum, or releasing pressure from a booster axle system.

Although the present invention has been described with reference to preferred embodiments, workers skilled in the art will recognize that changes may be made in form and detail without departing from the spirit and scope of the invention. For example, several of the embodiments discussed above feature load cells as the type of sensor used. However, further embodiments of the present invention anti-rollover system will use a wide variety of different sensors that sense and measure input data representative of operating conditions of the concrete mixing truck. The type of sensors used may include accelerometers, hydraulic pressure sensors or torque sensors. Examples of the processors which evaluate the input data relative to stored data indicative of rollover conditions and initiate corrective action to prevent a rollover include a control system comprised of an electronic control unit and analyzer module or a computer, such as a central processing unit or programable logic controller. Examples of transmitting means for transmitting the input data the sensors includes an electrical connection, a digital data log, or electronic control unit. In addition, the present invention anti-rollover system is also employed on a front-discharge mixer where the chute is located forward of the truck's cab (i.e. the drum sits "backward" on a front-discharge truck). The anti-rollover system is equally applicable for left turns.

What is claimed is:

1. A method for preventing rollovers of a moving concrete mixing truck, the concrete mixing truck of a type having a cab, a chassis, and a drum for mixing concrete supported by the chassis, the drum attached between a front pedestal and a rear pedestal connected to a frame of the chassis wherein a drum motor controls rotation of the drum, the method comprising:
   rotating the drum in a clockwise direction at a speed based upon a transmission speed of the concrete mixing truck;
   sensing input data representative of operating conditions of the concrete mixing truck;
   comparing the input data relative to stored data indicative of a rollover to determine whether the truck is in a potential rollover condition; and
   initiating a corrective action unrelated to a speed of the truck based on the compared data to prevent a rollover of the truck, wherein the step of initiating a corrective action comprises transmitting a signal to a drum relief valve associated with a hydraulic line to the drum motor.

2. The method of claim 1 wherein the step of transmitting a signal to the drum relief valve comprises opening the drum relief valve to stop rotation of the drum.

3. The method of claim 1 wherein the step of transmitting a signal to the drum relief valve comprises partially opening the drum relief valve to slow rotation of the drum.

4. The method of claim 1 wherein the step of sensing input data comprises sensing a load of concrete within the drum.

5. The method of claim 1 wherein the concrete mixing truck comprises a booster axle system attached to a rear of the chassis, the booster axle system being controlled by a booster relief valve and being movable between a load position, an unload position and a raised position, and wherein the step of initiating a corrective action comprises transmitting a signal to the booster relief valve to move the booster axle system to the unload position.

6. The method of claim 1 or 5 and further comprising initiating a second corrective step comprising decelerating the concrete mixing truck.

7. A control system for preventing rollovers of a moving concrete mixing truck having a rotating drum, the control system comprising:
   a sensor associated with the truck, the sensor capable of generating a signal representative of an operating condition of the truck indicative of a rollover;
   a hydraulic system comprising a hydraulic drum motor and a drum hydraulic relief valve in communication with the hydraulic drum motor; and
   a computer in communication with the sensor and the drum hydraulic relief valve, the computer capable of generating an output signal to the drum hydraulic relief valve in response to the sensor signal.

8. The control system of claim 7 wherein the truck further comprises a booster axle system, and wherein the hydraulic system further comprises a hydraulic cylinder connected between the truck and the booster axle system and a booster axle hydraulic relief valve in communication with the hydraulic cylinder, the computer being in communication with the booster axle hydraulic relief valve and capable of generating an output signal to the booster axle hydraulic relief valve in response to the sensor signal.

9. An anti-rollover system for preventing rollovers of a moving concrete mixing truck of a type having a cab, a chassis, and a drum for mixing concrete supported by the chassis, the drum attached between a front pedestal and a rear pedestal connected to a frame of the chassis wherein a drum motor controls rotation of the drum, the anti-rollover system comprising:
   sensing means for generating a first signal representative of an operating condition of the truck;
   processing means communicating with the sensing means for analyzing the first signal relative to stored data indicative of rollover conditions and generating a second signal representative of a corrective action; and
   means communicating with the processing means, unrelated to a speed of the truck, for initiating the corrective action, wherein the means for initiating corrective action comprises a hydraulic system of the truck.

10. The anti-rollover system of claim 9 wherein the sensing means comprises first and second load cells, the first load cell positioned to measure a load on a first side of the drum and the second load cell positioned to measure a load on a second side of the drum.

11. The anti-rollover system of claim 10 wherein first and second drum rollers are attached to the rear pedestal and engage a rear portion of the drum, and further wherein the first and second load cells are associated with the first and second drum rollers, respectively.

12. The anti-rollover system of claim 10 wherein the first and second load cells are positioned between the rear pedestal and the frame of the chassis.

13. The anti-rollover system of claim 10 wherein the first and second load cells are positioned between the front pedestal and the frame of the chassis.

14. The anti-rollover system of claim 10 wherein the first and second load cells are associated with a tire axle of the concrete mixing truck.

15. The anti-rollover system of claim 9 wherein the sensing means comprises means for measuring lateral acceleration of the concrete mixing truck.

16. The anti-rollover system of claim 15 wherein the means for measuring lateral acceleration comprises an accelerometer mounted to a braking system of the concrete mixing truck.

17. The anti-rollover system of claim 9 wherein the processing means comprises a computer.

18. The anti-rollover system of claim 9 wherein the hydraulic system comprises a drum relief valve to control the drum motor.

19. The anti-rollover system of claim 9 wherein the concrete mixing truck comprises a booster axle system attached to a rear of the chassis, the booster axle system movable between a load position and a an unload position, and further wherein the hydraulic system comprises a booster relief valve to control the booster axle system.

20. A method for preventing rollovers of a moving concrete mixing truck, the concrete mixing truck of a type having a cab, a chassis, and a drum for mixing concrete supported by the chassis, the drum attached between a front pedestal and a rear pedestal connected to a frame of the chassis wherein a drum motor controls rotation of the drum, the method comprising:
   rotating the drum in a clockwise direction at a speed based upon the transmission speed of the concrete mixing truck;
   sensing input data representative of operating conditions of the concrete mixing truck;

comparing the input data relative to stored data indicative of a rollover to determine whether the truck is in a potential rollover condition; and initiating a corrective action to a hydraulic system of the truck, unrelated to a speed of the truck, based on the compared data to prevent a rollover of the truck.

21. An anti-rollover system for preventing rollovers of a moving concrete mixing truck of a type having a cab, a chassis, and a drum for mixing concrete supported by the chassis, the drum attached between a front pedestal and a rear pedestal connected to a frame of the chassis wherein a drum motor controls rotation of the drum, the anti-rollover system comprising:

sensing means for generating a first signal representative of an operating condition of the truck;

processing means communicating with the sensing means for analyzing the first signal relative to stored data indicative of rollover conditions and generating a second signal representative of a corrective action; and means communicating with the processing means, unrelated to the speed of the truck, for automatically initiating the corrective action without operator input.

* * * * *